(12) United States Patent
Mikles

(10) Patent No.: US 9,189,466 B2
(45) Date of Patent: Nov. 17, 2015

(54) CROSS DOCUMENT COMMUNICATION

(71) Applicant: LinkedIn Corporation, San Jose, CA (US)

(72) Inventor: Kevin Mikles, San Francisco, CA (US)

(73) Assignee: LinkedIn Corporation, Mountain View, CA (US)

( * ) Notice: Subject to any disclaimer, the term of this patent is extended or adjusted under 35 U.S.C. 154(b) by 0 days.

(21) Appl. No.: 14/025,825

(22) Filed: Sep. 13, 2013

(65) Prior Publication Data
US 2015/0082321 A1    Mar. 19, 2015

(51) Int. Cl.
*G06F 17/24* (2006.01)
*G06F 9/54* (2006.01)
*G06F 17/22* (2006.01)

(52) U.S. Cl.
CPC ............... *G06F 17/24* (2013.01); *G06F 9/546* (2013.01); *G06F 17/2247* (2013.01)

(58) Field of Classification Search
CPC ...... G06F 9/546; G06F 17/2247; G06F 17/24
See application file for complete search history.

(56) References Cited

U.S. PATENT DOCUMENTS

| | | | |
|---|---|---|---|
| 7,984,170 B1 * | 7/2011 | Shalla et al. | 709/229 |
| 8,347,083 B1 | 1/2013 | Scudder | |
| 8,364,782 B2 | 1/2013 | Couvreur | |
| 8,365,061 B1 | 1/2013 | Bloom et al. | |
| 8,489,878 B2 | 7/2013 | Isaacs et al. | |
| 8,689,099 B1 | 4/2014 | Hanni et al. | |
| 9,037,963 B1 * | 5/2015 | Chandi | G06F 21/00 715/234 |
| 2007/0113237 A1 | 5/2007 | Hickson | |
| 2007/0299857 A1 * | 12/2007 | Gwozdz et al. | 707/102 |
| 2009/0037806 A1 | 2/2009 | Yang et al. | |
| 2009/0204886 A1 | 8/2009 | Xu et al. | |
| 2009/0276835 A1 * | 11/2009 | Jackson et al. | 726/4 |
| 2009/0300496 A1 * | 12/2009 | Fan et al. | 715/711 |
| 2009/0328063 A1 * | 12/2009 | Corvera et al. | 719/315 |
| 2010/0299205 A1 | 11/2010 | Erdmann et al. | |
| 2011/0283215 A1 * | 11/2011 | Dunn et al. | 715/771 |
| 2012/0066296 A1 * | 3/2012 | Appleton et al. | 709/203 |
| 2012/0078707 A1 | 3/2012 | Ramakrishnan et al. | |
| 2012/0131448 A1 * | 5/2012 | Chijiiwa et al. | 715/240 |
| 2012/0159307 A1 | 6/2012 | Chung et al. | |
| 2012/0317238 A1 | 12/2012 | Beard | |
| 2013/0166529 A1 * | 6/2013 | Shuster | 707/706 |
| 2013/0191880 A1 * | 7/2013 | Conlan et al. | 726/1 |

(Continued)

OTHER PUBLICATIONS

U.S. Appl. No. 14/225,148, Filed Mar. 25, 2014, Office Action, Mailing Date Jun. 15, 2015.

*Primary Examiner* — Charles E Anya
(74) *Attorney, Agent, or Firm* — Hickman Palermo Becker Bingham LLP; Daniel D. Ledesma

(57) ABSTRACT

Techniques for allowing cross-document communication are provided. In one approach, a child document of a parent document communicates with another child document of the parent document. A child document may correspond to a frame element within the parent document. The communication may occur directly or indirectly through the parent document. In another approach, an ancestor document communicates with a descendant document that is two or more degrees of separation away from the ancestor document. The communication may occur directly or indirectly through one or more intermediate documents. In both approaches, one document may send out one or more discovery messages that request identities of sibling documents, descendant documents, or ancestor documents.

28 Claims, 3 Drawing Sheets

(56) References Cited

U.S. PATENT DOCUMENTS

| | | |
|---|---|---|
| 2013/0204710 A1 | 8/2013 | Boland et al. |
| 2013/0326210 A1* | 12/2013 | O'Connor et al. ............ 713/150 |
| 2013/0347070 A1* | 12/2013 | Cairns et al. ..................... 726/3 |
| 2014/0082140 A1 | 3/2014 | Toussaint et al. |

* cited by examiner

CROSS DOCUMENT COMMUNICATION

FIELD OF THE DISCLOSURE

The present disclosure relates generally to communication between related documents and, more specifically, between documents that are at the same level in a document hierarchy or between documents that are at two or more levels away from each other in a document hierarchy.

BACKGROUND

The World Wide Web is an interlinked set of documents that reside on web servers throughout the world. Web browsers executing on client devices (such as laptop computers) employ the HTTP protocol to request documents from web servers. A web browser processes a received document to render a web page that is displayed within the browser's window.

Some documents are relatively large and, thus, require more time and computing resources to render a corresponding web page. Some web pages allow users to provide input, which causes the web pages to be updated. In some cases, the update is relatively minor; however, a complete refresh of the web page may be necessary.

To address this problem, frames have been developed. A frame is an element, within a document, that refers to another document, which is also rendered as a web page. Thus, a web page may be contained within another webpage. In this way, a user may interact with the "nested" or "child" web page without requiring the "root" or "parent" webpage to be refreshed.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
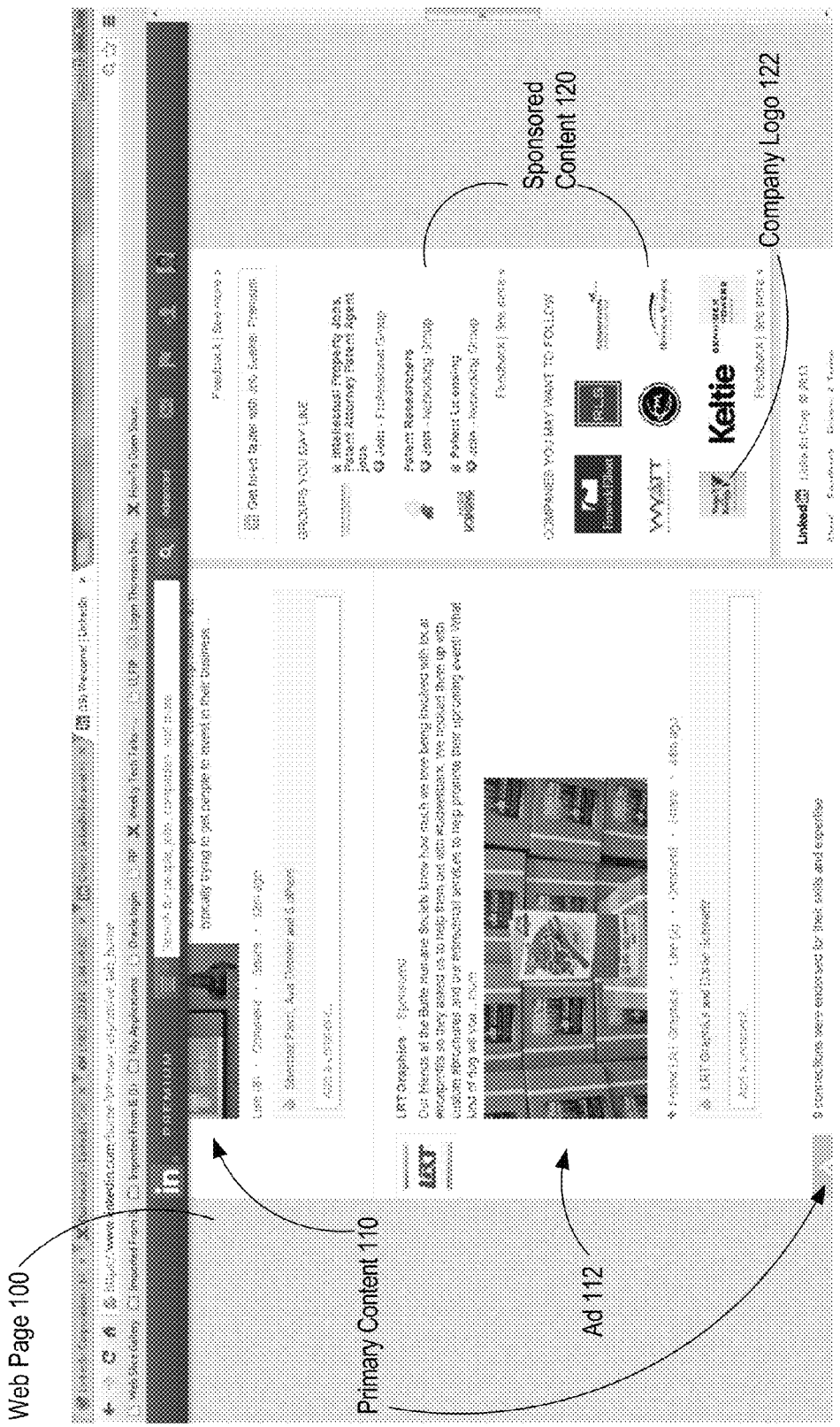
FIG. 1 is a block diagram that depicts an example web page that includes an ad that is displayed among primary content of the web page, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for cross-document communication. In one approach, a particular document has at least one child document, which has a particular child document, which is considered a "grandchild" of the particular document. Conversely, the particular document is considered a "grandparent" of the particular child document. The grandparent document communicates with the grandchild document either directly or indirectly through one or more intermediate documents.

In a related approach, two child documents of a particular document communicate with each other, either directly or indirectly through the particular document. In either approach, if an intermediate document is involved, then the intermediate document receives a message from a sender and may determine, based on destination data within the message, to which document to forward target data within the message. Alternatively, the intermediate document may forward the target data to multiple related documents and the multiple related documents are responsible for determining whether to process the target data.

While the following description refers to documents communicating with each other, a document typically includes text and HTML code that, when processed by a browser, causes a web page to be rendered. A document may include executable (e.g., JavaScript) code that, when executed, causes a process to communicate with another process that is executing code of another document (such as a frame or pop-up window). Thus, "a first document communicates with a second document" is shorthand for a process associated with the first document communicating with a process associated with the second document.

Also, while the following description refers to two documents communicating with each other, such "communicating" does not necessarily imply two-way communication. Thus, a first document communicating with a second document may involve the first document sending a message (directly or indirectly) to the second document, the second document sending a message (directly or indirectly) to the first document, or both.

Messaging Overview

Cross-document communication occurs on a single client device. A client device is any device that executes a web browser that is configured to generate a web page based on a web document that includes HTML code and, optionally, other code, such as XML and JavaScript. Examples of client devices include desktop computers, laptop computers, tablet computers, and smartphones. Examples of browsers include Microsoft's Internet Explorer™, Mozilla's Firefox™, Apple's Safari™, and Google's Chrome™.

A web browser receives and processes a web document to render a web page. The web browser may have requested the document from a web server and received the document over a network. Alternatively, the web browser may have retrieved the document from local storage, such as storage of the client device or storage on a network that is local to the client device.

Typical HTML documents include a head element and a body element. Some HTML documents include one or more "frame" elements, each of which is a part of a document and, when processed, is used to display content that is independent of its container (or "source" document). When processed, a frame element within a document effectively places content (such as a web page, video, graphics, text, etc.) within a frame of a web page that is rendered based on the document. Thus, frame content is displayed in the same window that displays contents from the document that contains the corresponding frame element. In HTML, frame elements are referred to as "iframe" elements.

Instead of frame elements, an HTML document may include code (e.g., JavaScript) that, when processed by a web browser, causes a pop-up (or pop-under) window to be generated. The pop-up window is separate from the window in which the web page (that is rendered based on the HTML document) is displayed. Cross-document communication, as described herein, applies to both frames and pop-up windows, where frames and pop-up windows are considered "children" of the document from which the frames and pop-up windows originate.

Frames may be used in any number of ways. For example, a particular document may include a frame element that includes a reference (e.g., URL) to an advertisement. When a browser loads the particular document, the browser processes the content of the frame element, identifies the reference, and retrieves ad content of the advertisement using the reference. The reference may be associated with a specific ad or may simply refer to an ad service that is responsible for retrieving a specific ad. The ad content may be retrieved from (a) the same source (e.g., web server) from which the particular document was retrieved or (b) another source, such as an advertiser that is responsible for distributing the ad. The ad content or the frame element may include executable code that, when processed, causes a new process to be generated for the frame (or child document) and the new process to send a message to the particular document. The new process acts independently of the process associated with the particular document.

A frame may be located anywhere within a document. In the ad context, a frame for an ad may be restricted to a certain portion of the web page rendered for the document. Some frames may correspond to the right side of a rendered web page where ads are typically shown. In an embodiment, frames are interleaved among primary content within a rendered web page. The primary content gives users a reason to "visit" the web page. For example, the primary content is displayed in the center portion of a web page (i.e., neither the left nor right side of the web page). If the web page is about current world news, then the primary content may comprise a set of abstracts of and/or links to news stories. One or more frames that correspond to ad content are displayed in between each continuous set of one or more abstracts/links. In this way, when the web page is rendered, ads are displayed in between the abstracts/links related to the news stories.

Each frame is associated with a certain area. A frame within a document may be relatively large or relatively small. If a document includes multiple frames, then the size of each frame may be the same or may vary from frame to frame.

Example Use of Frames

FIG. 1 is a block diagram that depicts an example web page 100 that includes primary content 110, ad 112, and sponsored content 120, in an embodiment. Ad 112 is displayed within a frame of web page 100. Primary content 110 is considered to be displayed in the "main" frame of web page 100. In other words, primary content 110 may be content that is not within any frame elements of the document from which web page 100 was generated.

Thus, web page 100 that is associated with multiple child documents. Primary content 110 includes information relevant to the entity (e.g., company or other organization) to which the website pertains. Primary content 110 is interleaved with advertisements. In this example, sponsored content 120 includes only advertisements.

In addition to ad 112, sponsored content 120 is also displayed using frames. Sponsored content 120 includes two main sections: a "Groups You May Like" section and a "Companies You May Want To Follow" section. Each section may correspond to a different single frame. Alternatively, multiple sections may correspond to a single frame.

Each section includes ads that may or may not have been selected based on attributes of a user that is currently logged in with respect to the web site that hosts web page 100. For example, the logos of companies in the second section of sponsored content 120 may have been selected based on the work history, education history, list of skills, and/or "connections" (or "friends") associated with the logged-in user. Thus, once the user logs into the website, the website accesses information about the user and uses that information to determine what to display to the user. As another example, the logos of companies in the second section may have been selected based on one or more factors that are independent of any attributes of the logged-in user.

Example Messaging API

In an embodiment, one document communicates with another document using an API. An example of such an API is described in the HTML5 draft specification, dated Dec. 2012, and incorporated herein by reference as if fully disclosed herein. Previous to HTML5, web browsers prevented a first document from one origin (or source domain) to communicate with a second document from a different origin. The API includes a postMessage method that allows messages to be sent from one origin/domain to another. Messages can be posted to the following: (a) other frames or iframes within the sender document's window; (b) windows the sender document explicitly opens through JavaScript calls; (c) the parent window of the sender document; (d) the window which opened the sender document. The message event being received has the following attributes: (1) "data", which is the actual content of the incoming message; (2) "origin", which is the origin of the sender document and may include the scheme, hostname, and port; and (3) "source", which is the WindowProxy of where the document came from (i.e., the source window).

Example Message

The following is an example JavaScript code to allow a document A to communicate with a document B, which is contained within an iframe or popup window. Example JavaScript code for document A is as follows:
  var o=document.getElementsByTagName('iframe')[0];
    o.contentWindow.postMessage('Hello B', 'http://documentB.com/');

The origin of the "contentWindow" object is passed to postMessage. The origin must match the origin of document B. Otherwise, a security error may be thrown and the script may stop. Example JavaScript code for document B is as follows:

```
function receiver(event) {
    if (event.origin == 'http://documentA.com') {
        if (event.data == 'Hello B') {
            event.source.postMessage('Hello A, how are you?',
                event.origin);
        }
        else {
            alert(event.data);
        }
    }
}
window.addEventListener('message', receiver, false);
```

An event listener is set up to receive messages from document A. Using the origin attribute, the event listener checks that the domain of the sender is the expected domain. Document B then looks at the message, either displaying the content of the message to the user or responding in turn with a message of its own for document A.

While the above example involves a message with a single data item (i.e., "Hello B"), in an embodiment, a message contains multiple data items. For example, a message may contain (1) target data that is to be used by a receiving document to perform some action (such as displaying a message or graphic or responding to the sending document with certain data) and (2) destination data that allows a receiving document to determine (a) whether to process the target data or (b) one or more documents to which target data should be forwarded. If a message contains multiple data items, then the multiple data items may be ordered and delimited in a manner that a receiving document is configured to process. For example, multiple data items may be delimited with a space (' '), a comma (','), or a semicolon (';'), or packed into a JavaScript Object Notation (JSON) string. As another example, if a document detects multiple data items in a message, then that means that the first data item is destination data and the second data item is target data. Otherwise, a single data item in a message indicates that the data item is target data.

Types of Information within a Message

The type of information that one document sends to another document may vary widely. Embodiments are not limited to any particular type. Messages may contain anything that can be represented by a character string, such as a reference to an HTML element, a timestamp, and the name of a function to run. For example, a first document may send, to a second document, time data that indicates when a certain event occurred along with a document identifier that identifies the first document. Such an event may be the processing of (e.g., JavaScript) code associated with the first document. The document identifier may be taken from the event object that contains the message, such as the event "origin" or the event "source." However, such identifiers may not be unique. Alternatively, the document identifier is a string of characters that may be read from the first document. For example, the string of characters may be in anchor tag sources or iframe hrefs. Generally, the document identifier is any unique (or almost unique) string, such as characters parsed from the URL of the first document or pulled from a JavaScript variable found in the first document.

The time data and document identifier may be used by the second document (or another entity, such as a server that served the second document) to determine how long it took the first document to load or be processed once the second document (or a portion thereof) was processed. "Loading" a document may involve processing all or at least a particular portion of the document, such as a portion that includes executable code that, when processed, causes the document to communicate with another document. This processing may be repeated for numerous documents to determine which documents are the best (or worst) in terms of loading.

Another type of information that a first document sends to a second document is presentation data that is to be displayed over the second document. For example, the first document may include a button that, when selected, causes a video of the first document to be played over content of the second document. In other words, the video is played outside the area of the first document. A specific example of the first document is a pop-up ad.

Intra-family Communication

Cross-document communication is communication between two documents of the same "family" of documents. A family of documents is a set of documents that are created based on a single "root" document. A family of documents includes a single root document and one or more child documents of the root document. Each child document may have one or more child documents of its own.

Figure 2:
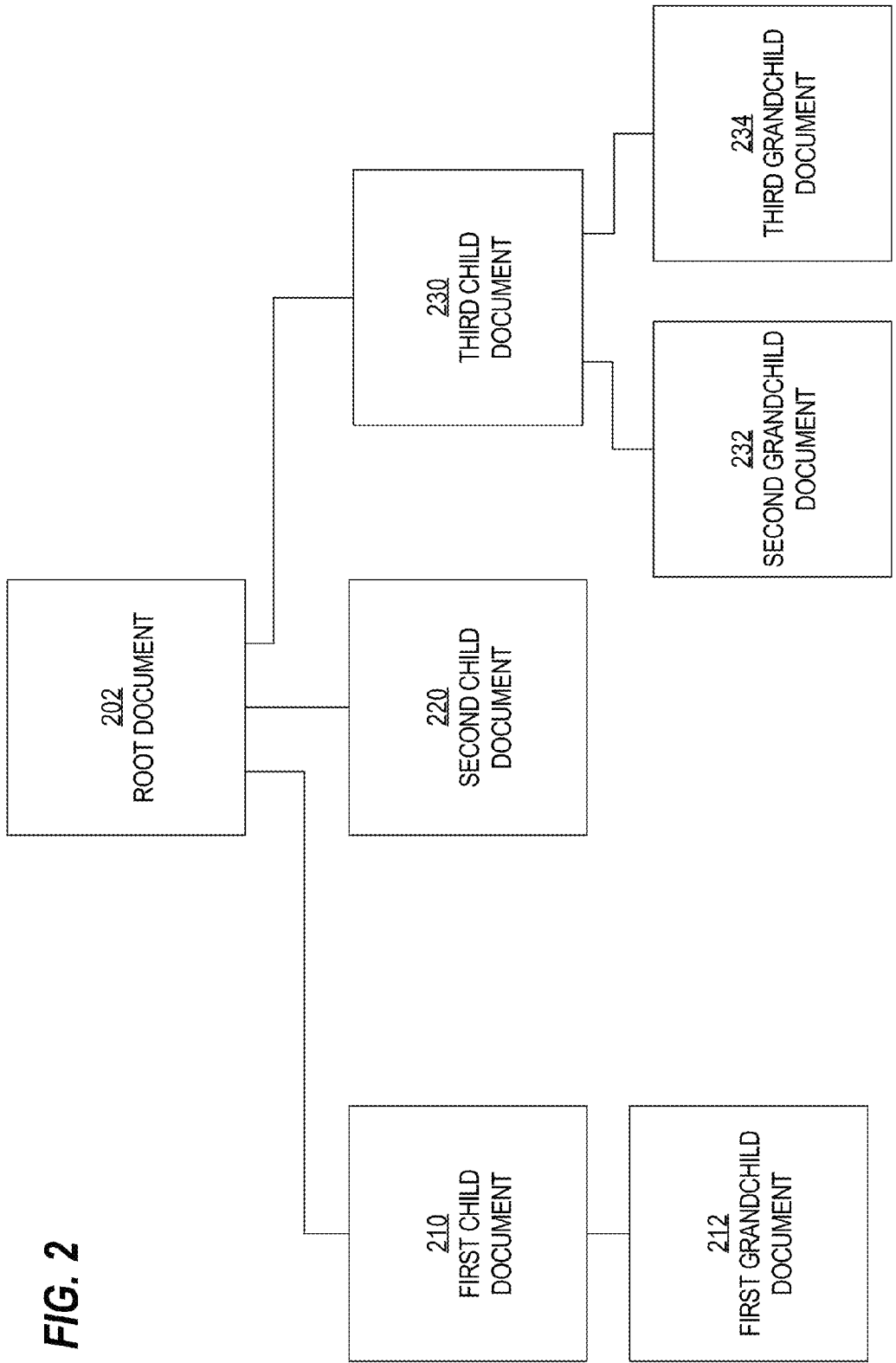
FIG. 2 is a block diagram that depicts an example family of documents, in an embodiment.

FIG. 2 is a block diagram that depicts an example family of documents 200, in an embodiment. Family 200 includes a root document 202, a first child document 210, a second child document 220, and a third child document 230. Child documents 210, 220, and 230 are child documents of root document 202. Family 200 also includes a first grandchild document 212 (which is a child of first child document 210), a second grandchild document 232 (which is a child of third child document 230), and a third grandchild document 234 (which is also a child of third child document 230).

One type of communication is between a parent document and a child document of that parent document (which may or may not be the root document). This type of communication is referred to as "parent-child" communication. An example in FIG. 2 is root document 202 communicating with first child document 210.

Another type of communication is between two child documents of a parent document. This type of communication is referred to herein as "sibling" communication. An example in FIG. 2 is first child document 210 communicating with second child document 220.

Another type of communication is between one document and a grandchild or great-grandchild document of the document. This type of communication is referred to herein as "ancestor-descendant" communication. An example in FIG. 2 is root document 202 communicating with second grandchild document 232.

Another type of communication is between two "cousin" documents (which have a common grandparent document but not a common parent document). This type of communication is referred to herein as "cousin" communication. An example in FIG. 2 is first grandchild document 212 communicating with second grandchild document 232.

Grandchild Communication

In an embodiment, a first document communicates with a grandchild document of the first document. Although "grandchild" implies two degrees away from a particular entity, "grandchild document" includes a document that may be three or more degrees away from the particular entity. For example, a first document may have an iframe element that corresponds to a second document, which is a child of the first document. The second document is one degree away from the first document. The second document may have an iframe element that corresponds to a third document, which is a child of the second document and a "grandchild" of the first document. In other words, the third document is two degrees away from the first document. Hereinafter, two documents that are two or more degrees away from each other are referred to as an "ancestor document" and a "descendant document" (or simply "ancestor" and "descendant").

The one or more documents that are logically between an ancestor and a descendant are referred to herein as "intermediate documents" or "intermediaries." In the example above, the second document is considered an intermediate document with respect to the first and third documents.

In an embodiment, an ancestor is the root document in a document family or hierarchy. A root document is one that is not within any other document. In an alternative embodiment, an ancestor is not a root document. For example, the ancestor may be a child or a grandchild of a root document.

Communicating Through an Intermediary

In an embodiment, an ancestor and descendant communicate indirectly through one or more intermediaries. The first message includes destination data that indicates whether the intermediary should forward content within the first message (referred to herein as "target data") to another document. The destination data may have varying levels of specificity. For example, the destination data may identify the ancestor (or descendant), such as through a URL or other document identifier. As another example, the destination data may indicate that the root document is to receive the target data within the first message. For example, the destination data may include a parameter value or attribute value that indicates that the corresponding message (or portion thereof) is to be forwarded to the root document or to a document that is two degrees away from the descendant.

An example of destination data with less specificity is destination data that indicates an attribute or characteristic of the sender or of the intended receiver. Thus, the destination data may not identify the intended recipient of the target data. Thus, at the time the sender (whether an ancestor or descendant) transmits a message that includes target data, the sender may not know who the intended recipient(s) is/are. Examples of attributes or characteristics include frames with a certain display attribute, such as frames of a particular size, frames of a particular color, and frames with a particular border thickness, style or size. Other examples of attributes or characteristics pertain to the type of content that a frame might contain, such as content associated with a particular category (e.g., sports, news, weather, etc.) and a particular company. Another example of an attribute or characteristic associated with a document is the source from which the document is generated or provided, such as a URL or a particular domain or subdomain.

In response to receiving a message from a sender (whether an ancestor or descendant), an intermediary determines, based on the destination data within the first message, which document is to receive the target data. The intermediary generates a second message and includes the target data from the first message in the second message. The intermediary sends the second message to the intended receiver (whether a descendant or ancestor).

In an embodiment, before sending the second message to the intended receiver, an intermediary first performs an origin check to determine whether the sender belongs to an authorized set of senders. This origin check may involve determining a URL of the sender (e.g., "http://senderA.com") and comparing the URL against one or more URLs in a set of authorized URLs. Alternatively, the intermediary generates a hash value using a hash function and the URL as input and compares the hash value to one or more previously-generated hash values. If the intermediary determines a match, then the intermediary sends the second message to the intended receiver. Otherwise, the intermediary will not send (or even generate) the second message, a security error may be thrown, and the intermediary may stop executing.

In an embodiment, the intended receiver of a message from an intermediary also performs an origin check. The origin check performed by the intended receiver may verify that the origin of the intermediary and/or the origin of the target data are legitimate or expected. Thus, the intended receiver may maintain a list of valid senders and/or intermediaries when performing an origin check.

A descendant may communicate with an ancestor for any number of reasons. For example, a descendant may send back time data that indicates when the descendant was initially loaded or processed. An ancestor may use the time data to determine how long it took for the descendant to load. An administrator may use load time information to determine which documents are taking longer to load and, based on the information, select different documents to load in place of the "slower" documents.

Similarly, an ancestor may communicate with a descendant for any number of reasons. For example, an ancestor may send user data to which a descendant may not have access, such as user profile information that is part to the ancestor's session. User profile information may include age, gender, residence, employment history, hobbies, and/or interests of a user. With such (dynamic) user data, the descendant may then use that data to display certain content. For example, if one of the interests or hobbies of a user matches, or is aligned with, the business of an advertiser associated with a descendant, then the descendant might highlight (or further distinguish) itself, such as by changing its border or including animated graphics. As another example, if one of the hobbies of a user is fishing, then the descendant may display, in response to determining that "fishing" is an interest of the user, information about international fishing excursions in which the user might be interested.

Communicating Directly

In an embodiment, an ancestor document and a descendant document communicate directly, i.e., without having to pass a message to any intermediate document. In order for one document to send a message directly to the other document, the first document must have data that identifies the second document. One approach for an ancestor to have data that identifies a descendant is for an ancestor to send, to one or more child documents of the ancestor document, a "discovery" message that requests information about child documents of the one or more child documents. The request may be for all such descendants or may be for descendants that are associated with certain criteria, such as descendants that have certain characteristics or attributes. In response to receiving the request, each of the one or more child documents of the ancestor document forwards the message to its child documents (or only to those that satisfy certain criteria). Each descendant that receives the message (and, optionally, determines that the descendant satisfies certain criteria), responds with a reply message that indicates the descendant's identity.

The descendant may send the reply message to its immediate parent or directly to the ancestor. The request that a descendant receives may include an identity of the ancestor in order to allow the descendant document to communicate directly with the ancestor. This scenario may be followed if the ancestor is not the root document. If the ancestor is the root document and a messaging API employed by the respective documents allows a document to reference the root document in a document hierarchy, then the descendant may send the reply message directly to the ancestor. (The above example involves an ancestor discovering one or more descendant documents. A similar approach involves a descendant discovering an ancestor.)

Another approach for an ancestor to have data that identifies a descendant is the ancestor being configured to know identities of one or more descendants. For example, an ancestor stores data that indicates an identity of each child document (e.g., "ch1", "ch2", etc.') and is configured to know the naming convention of each child of the child documents.

Thus, an ancestor may send, to a particular child of the ancestor, a message that (1) indicates that target data within the message should be forwarded to a particular descendant and (2) includes destination data (e.g., "desc2") that indicates which descendant is to receive the target data. The particular child determines, based on the destination data, that the target data should be forwarded to the second child of the particular child.

In an embodiment, the intended receiver of a message in the direct communication scenario performs an origin check on the identity of the sender (whether an ancestor or descendant).

Sibling Communication

As noted previously, sibling communication is when one child document communicates with another child document, where both child documents have the same parent document, which may or may not be the root document.

As in the ancestor-descendant scenario described previously, when a sending child sends a message that is to be received by a sibling, the sender may or may not know the identity of the sibling. If the sender does know the identity of the sibling, then the sender may send a message directly to the sibling. If not, then the sender may attempt to discover the sibling through a common parent using one or more messages directed to the parent. Either the parent or the receiving sibling determines whether the target data within a message is to be processed by the sibling. As described previously, a message from the sender may include characteristic data or attribute data that an intended recipient must satisfy for a recipient to process the target data.

Returning to FIG. 1, FIG. 1 illustrates an example of sibling communication. FIG. 1 depicts ad 112, which appears within primary content 110 and corresponds to a child document of the parent document (which corresponds to web page 100). FIG. 1 also depicts company logo 122, which is within sponsored content 120 and corresponds to a child document of the parent document. A process associated with ad 112 may detect user input, such as a mouse-over or user selection of ad 112. In response, the process sends, to the parent, a message that indicates user input relative to ad 112. The message may include company identification data that identifies a company associated with ad 112. The parent may determine, based on the company identification data, which child document to inform. For example, upon loading of sponsored content 120, each child document associated with sponsored content 120 sends company data that indicates a name or identifier of the company associated with the child document. The parent receives the company identification data and stores, in a mapping, the company identification data in association with identities of the child documents. Upon receiving the message from ad 112, the parent looks up, in the mapping, a child identifier that is associated with the company identification data. The parent then sends a message to each identified child identifier (which may only be one). The message may indicate that the child document should perform an action, such as displaying additional text, graphics, audio, or video. For example, the border of company logo 122 in sponsored content 120 may be highlighted, indicating that ad 112 is associated with company logo 122.

Alternatively, the parent may send the company identification data (from the message from ad 112) to all children of the parent. In such an embodiment, each child is responsible for determining, based on the company identification data, whether the child should perform an action (e.g., highlighting)

In the foregoing sibling communication example, two sibling documents communicate through an intermediary, such as a common parent. Alternatively, two sibling documents communicate directly with each other. Techniques for siblings determining identities of each other are described above with respect to ancestor-descendant communication and may be used to allow two siblings to communicate with each other.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
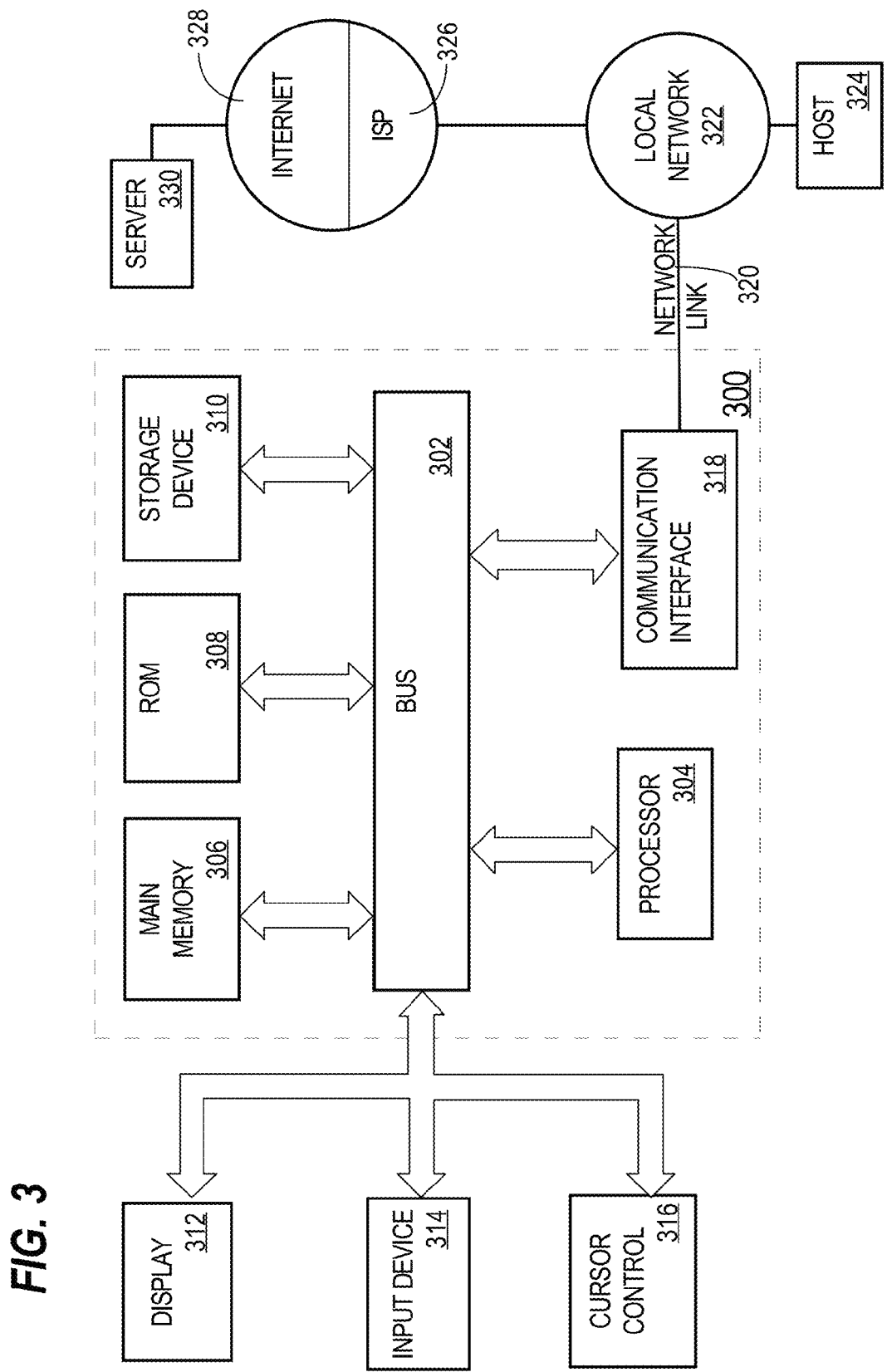
FIG. 3 is a block diagram that illustrates a computer system upon which an embodiment of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
  receiving, at a computing device, a first web document, a second web document, and a third web document;
  wherein (a) the first web document is a parent of the second web document and the second web document is a parent of the third web document or (b) the third web document is a parent of the second web document and the second web document is a parent of the first web document;
  generating, by a first process of the first web document, a message;
  sending the message from the first web document to the second web document that includes content that is separate from the message and that is displayed by the computing device;
  determining, based on second content within the message, which web document of a plurality of web documents is to receive target content within the message;
  determining, by a second process of the second web document, that the third web document is to receive the target content within the message;
  wherein determining that the third web document is to receive the target content with the message comprises determining, based on the second content within the message, that the third web document is to receive the target content within the message;
  generating, by the second process of the second web document, a second message; and
  sending the second message and the target content from the second web document to the third web document, wherein the third web document is a grandchild or a grandparent of the first web document.

2. The method of claim 1, wherein the first web document is a parent of the second web document and the second web document is a parent of the third web document.

3. The method of claim 2, wherein:
the second web document is a first frame element in the first web document; and
the third web document is a second frame element in the second web document.

4. The method of claim 1, wherein the third web document is a parent of the second web document and the second web document is a parent of the first web document.

5. The method of claim 1, wherein the second content is destination data that indicates which document is to receive the target content.

6. The method of claim 1, wherein the second content is attribute data that indicates one or more attributes associated with the first web document or the third web document.

7. The method of claim 1, further comprising:
receiving, by a third process of the third web document, the target content in the second message that is generated by the second process of the second web document and that includes attribute data that is separate from the target content; and
determining, by the third web document, based on the attribute data, whether to process the target content.

8. The method of claim 1, wherein the target content indicates one or more of time data that indicates when a particular event occurred, presentation data that is to be displayed over the third web document, a highlight instruction that a third process of the third web document is to use to visually distinguish the third web document, or user data that is about a particular user of a social network and that the third process uses to dynamically display content about the particular user or to generate content about the particular user within the third web document.

9. The method of claim 8, wherein the target content indicates the user data that is about the particular user of the social network and that the third process uses to dynamically display content about the particular user or to generate content about the particular user within the third web document.

10. A method comprising:
receiving, at a computing device, a plurality of documents that includes a first document, an intermediate document, and a second document that is an ancestor or descendant of the intermediate document;
sending target data from the first document to the second document;
wherein sending the target data comprises:
creating, by a first process of the first document, a first message;
sending the first message from the first document to the intermediate document;
receiving, by an intermediate process of the intermediate document, the first message;
in response to receiving the first message, determining, by the intermediate process, based on one or more attributes of the first document or the second document, to which destination document a message should be sent, wherein the one or more attributes do not identify the second document;
determining, based on the one or more attributes, to send a message to the second document;
creating, by the intermediate process of the intermediate document, based on the first message, a second message that includes the target data; and
sending the second message from the intermediate document to the second document.

11. The method of claim 10, wherein creating, by the first process, the first message comprises creating the first message in response to user input relative to the first document.

12. The method of claim 10, wherein the target data includes one or more of time data that indicates when a particular event relative to the first document occurred, presentation data that is to be displayed over the second document, or a highlight instruction that a second process of the second document is to use to visually distinguish at least a portion of the second document.

13. The method of claim 10, wherein the one or more attributes of the first document or second document includes a display attribute of the first document or the second document, a type of content contained within the first document or the second document, or domain of the first document.

14. The method of claim 13, wherein the one or more attributes of the first document or second document includes a type of content contained within the second document.

15. The method of claim 10, further comprising, in response to receiving the first message, sending, by the intermediate process, to one or more other documents that are different than the second document, a third message that contains the target data.

16. A system comprising:
one or more processors;
one or more non-transitory storage media carrying instructions which, when executed by the one or more processors, cause:
receiving, at a computing device, a first web document, a second web document, and a third web document;
wherein (a) the first web document is a parent of the second web document and the second web document is a parent of the third web document or (b) the third web document is a parent of the second web document and the second web document is a parent of the first web document;
generating, by a first process of the first web document, a message;
sending the message from the first web document to the second web document that includes content that is separate from the message and that is displayed by the computing device;
determining, based on second content within the message, which web document of a plurality of web documents is to receive target content within the message;
determining, by a second process of the second web document, that the third web document is to receive the target content within the message;
wherein determining that the third web document is to receive the target content with the message comprises determining, based on the second content within the message, that the third web document is to receive the target content within the message;
generating, by the second process of the second web document, a second message;
sending the second message and the target content from the second web document to the third web document, wherein the third web document is a grandchild or a grandparent of the first web document.

17. The system of claim 16, wherein the first web document is a parent of the second web document and the second web document is a parent of the third web document.

18. The system of claim 16, wherein the third web document is a parent of the second web document and the second web document is a parent of the first web document.

19. The system of claim 16, wherein the second content is destination data that indicates which document is to receive the target content.

20. The system of claim 16, wherein the second content is attribute data that indicates one or more attributes associated with the first web document or the third web document.

21. The system of claim 16, wherein the instructions, when executed by the one or more processors, further cause:
- receiving, by a third process of the third web document, the target content in the second message that is generated by the second process of the second web document and that includes attribute data that is separate from the target content;
- determining, by the third process of the third web document, based on the attribute data, whether to process the target content.

22. The system of claim 16, wherein the target content indicates one or more of time data that indicates when a particular event occurred, presentation data that is to be displayed over the third web document, a highlight instruction that a third process is to use to visually distinguish the third web document, or user data that the third process uses to dynamically display content or to generate content within the third web document.

23. A system comprising:
- one or more processors;
- one or more non-transitory storage media carrying instructions which, when executed by the one or more processors, cause:
  - receiving, at a computing device, a plurality of documents that includes a first document, an intermediate document, and a second document that is an ancestor or descendant of the intermediate document;
  - sending target data from the first document to the second document;
  - wherein sending the target data comprises:
    - creating, by a first process of the first document, a first message;
    - sending the first message from the first document to the intermediate document;
    - receiving, by an intermediate process of the intermediate document, the first message;
    - in response to receiving the first message, determining, by the intermediate process, based on one or more attributes of the first document or the second document, to which destination document a message should be sent, wherein the one or more attributes do not identify the second document;
    - determining, based on the one or more attributes, to send a message to the second document;
    - creating, by the intermediate process, based on the first message, a second message that includes the target data; and
    - sending the second message from the intermediate document to the second document.

24. The system of claim 23, wherein creating, by the first process, the first message comprises creating the first message in response to receiving user input relative to the first document.

25. The system of claim 23, wherein the first message includes particular data, wherein the instructions, when executed by the one or more processors, further cause:
- prior to sending the second message to the second document, identifying, by the intermediate process, the second document based on the particular data.

26. The system of claim 25, wherein the instructions, when executed by the one or more processors, further cause:
- determining, by the intermediate process, from among a plurality of related documents of the intermediate process, which related document is to receive the target data.

27. The system of claim 23, wherein the instructions, when executed by the one or more processors, further cause, in response to receiving the first message, sending a third message, that contains the target data, from the intermediate document to one or more other documents that are different than the second document.

28. The system of claim 23, wherein the target data includes one or more of time data that indicates when a particular event occurred, presentation data that is to be displayed over the second document, or a highlight instruction that a second child process of the second document is to use to visually distinguish at least a portion of the second document.

* * * * *